United States Patent

Watanabe

[11] Patent Number: 5,731,833
[45] Date of Patent: Mar. 24, 1998

[54] SOLID-STATE IMAGE PICK-UP DEVICE WITH REFERENCE LEVEL CLAMPING AND IMAGE PICK-UP APPARATUS USING THE SAME

[75] Inventor: Tohru Watanabe, Ogaki, Japan

[73] Assignee: Sanyo Electric Co., Ltd., Osaka, Japan

[21] Appl. No.: 563,522

[22] Filed: Nov. 28, 1995

[30] Foreign Application Priority Data

Nov. 28, 1994 [JP] Japan .................................. 6-293445

[51] Int. Cl.$^6$ .............................. H04N 5/217; H04N 9/64
[52] U.S. Cl. .................... 348/241; 348/222; 348/250; 348/311; 257/239; 377/62; 377/63
[58] Field of Search ........................ 257/239; 377/60, 377/61, 62, 63; 348/222, 228, 229, 230, 241, 243, 311, 315, 248, 249, 250; H04N 5/217, 9/64

[56] References Cited

U.S. PATENT DOCUMENTS

| | | |
|---|---|---|
| 4,875,098 | 10/1989 | Yamamoto et al. ............... 358/213.16 |
| 5,010,408 | 4/1991 | Toohey ............................. 358/213.11 |
| 5,144,444 | 9/1992 | Maclean .................................. 358/209 |
| 5,153,421 | 10/1992 | Tandon et al. ...................... 250/208.1 |
| 5,220,587 | 6/1993 | Takemoto et al. ...................... 377/57 |
| 5,274,687 | 12/1993 | Hirama .................................. 377/60 |
| 5,276,723 | 1/1994 | Miwada ................................. 377/60 |
| 5,467,130 | 11/1995 | Darden et al. ......................... 348/241 |
| 5,473,660 | 12/1995 | Bastiaens et al. .................... 378/98.8 |
| 5,475,427 | 12/1995 | Horowitz ............................... 348/241 |
| 5,515,103 | 5/1996 | Ito ........................................ 348/312 |

FOREIGN PATENT DOCUMENTS 62-55349  11/1987  Japan .

Primary Examiner—Andrew Faile
Assistant Examiner—Ngoc-yen Vu
Attorney, Agent, or Firm—Loeb & Loeb LLP

[57] ABSTRACT

In order to stabilize the reference level of an output signal from a solid-state image pick-up device, the solid-state image pick-up device includes an output circuit 12 for obtaining a picture signal Y1(t) from information charges outputted from a horizontal shift register 11, an impedance conversion circuit 13 for reducing the output impedance of the picture signal Y1(t) and a clamp circuit 14 for fixing the reference level in the picture signal Y1(t), all of which are integrated on the same semiconductor substrate.

7 Claims, 3 Drawing Sheets

SOLID-STATE IMAGE PICK-UP DEVICE WITH REFERENCE LEVEL CLAMPING AND IMAGE PICK-UP APPARATUS USING THE SAME

BACKGROUND OF THE INVENTION

1. Field of the Invention

The present invention relates to a solid-state image pick-up device having a reference level clamping function and an image pick-up apparatus including such a solid-state image pick-up device.

2. Description of the Related Art

CCD solid-state image pick-up devices mounted in image pick-up apparatuses such as TV cameras use a capacitor for converting the amount of information charges sequentially outputted from a horizontal shift register for each charge packet into picture signals which are voltage signals. For example, a capacitor on the output side of a horizontal shift register is first charged up to a predetermined level in synchronism with the transfer clock of the horizontal shift register and then discharged by information charges from the horizontal shift register. At this time, a change of potential in the capacitor is taken out as a picture signal. Therefore, the picture signals outputted from the solid-state image pick-up device will alternately have the reference level and a signal level representing the amount of information charges for one charge packet.

In such a solid-state image pick-up device, the charge level of the capacitor is not necessarily constant due to clocks for using the charging operation when the capacitor of the output section is being charged or due to noise contained in the power source or the like. The discharge level corresponding to the amount of information charges outputted from the horizontal shift register is determined depending on the charge level which is the reference level. If the reference level is influenced and caused to fluctuate by noise, the level of the picture signal does not accurately reflect the amount of information charges for one charge packet.

It is known in the art that the influence of noise can be canceled by detecting a difference between the reference and signal levels of the picture signal outputted from the solid-state image pick-up device, as described in Japanese Patent Publication No. Sho 62-55349.

In the drawings of this patent application, FIG. 1 is a block diagram of an image pick-up apparatus which can remove noise contained in the output of a solid-state image pick-up device while FIG. 2 is waveforms illustrating the operation of the image pick-up apparatus shown in FIG. 1.

CCD solid-state image pick-up device 1 has a plurality of light-receiving pixels which are arranged into a matrix. These light-receiving pixels generate and accumulate information charges through photoelectric conversion. A transfer clock generating circuit 2 is responsive to vertical and horizontal transfer timing signals VT, HT to generate vertical and horizontal transfer clocks $\phi V$, $\phi H$ which are in turn used to pulse drive the solid-state image pick-up device 1. Thus, packets of information charges accumulated in the respective light-receiving pixels of the solid-state image pick-up device 1 are sequentially transferred vertically through a vertical shift register and horizontally through a horizontal shift register respectively in response to the vertical and horizontal transfer clocks $\phi V$, $\phi H$ and transferred to the output section. In the output section of the solid-state image pick-up device 1, the capacitor is charged up to a reference level V0 for a charge time TC in synchronism with the horizontal transfer clock $\phi H$. Thereafter, a packet of the transferred information charges is received in the capacitor for a discharge time TD. Thus, the capacitor is discharged to a signal level V1 representing the amount of charges received therein. The resulting picture signal Y1(t) will be outputted from the output section of the solid-state image pick-up device 1.

The picture signal outputted from the solid-state image pick-up device 1 is then inputted into a multiplex sampling circuit 3. The multiplex sampling circuit 3 takes out a difference between the reference and signal levels in the picture signal Y1(t) to form a picture signal Y2(t) which is in turn outputted from the multiplex sampling circuit 3. The multiplex sampling circuit 3 comprises three sampling circuits $3a$–$3c$ and a differential amplifier $3d$. The sampling circuit $3a$ is responsive to a first sampling clock $\phi S1$, coincident in timing with the discharge time TD, to hold the signal level of the picture signal Y1(t) while the sampling circuit $3b$ is responsive to a second sampling clock $\phi S2$, coincident in timing with the charge time TC, to hold the signal level of the picture signal Y1(t). The sampling circuit $3c$ is responsive to the first sampling clock $\phi S1$ to hold the output of the sampling circuit $3b$. The differential amplifier $3d$ extracts a difference between the outputs of the sampling circuits $3c$ and $3a$, this difference being then outputted therefrom as a picture signal Y2(t). The picture signal Y2(t) thus obtained from the difference between the reference and signal levels of the picture signal Y1(t) can accurately indicate a signal level corresponding to the information charges accumulated in the respective light-receiving pixels of the solid-state image pick-up device 1 since noise contained in the picture signal Y1(t) has been canceled by the differential amplifier $3d$.

A timing pulse generating circuit 4 comprises a dividing circuit which generates vertical and horizontal transfer timing signals VT, VH respectively having vertical and horizontal scan cycles from constant-cycle reference clocks CK, these timing signals then being supplied to the transfer clock generating circuit 2. At the same time, the timing pulse generating circuit 4 forms first and second sampling clocks $\phi S1$, $\phi S2$ having a given duty ratio in synchronism with the horizontal transfer operation of the solid-state image pick-up device 1, that is, the horizontal transfer clock $\phi H$, these sampling clocks $\phi S1$ and $\phi S2$ then being supplied to the multiplex sampling circuit 3. In such a manner, the solid-state image pick-up device 1 can be actuated with a timing coincident with that of the multiplex sampling circuit 3.

The picture signal Y2(t) outputted from the multiplex sampling circuit 3 will be recorded on a recording medium through various picture signal processing circuits such as an automatic gain control circuit, gamma correction circuit and other circuits.

Since the multiplex sampling circuit 3 receiving the picture signal Y1(t) at the input thereof is actuated at such a high frequency as in the output of the solid-state image pick-up device 1, it is difficult to phase the transfer within the solid-state image pick-up device 1 in synchronism with the sampling operation of each of the sampling circuits $3a$–$3c$ and to therefore maintain stable operational properties. Particularly, a circuit actuated at a high frequency tends to be influenced by the layout of components forming the circuit. In order to forming a sampling circuit made up of a combination of components on a circuit substrate, there are various restrictions. Therefore, the degree of freedom in the design of the pattern on the circuit substrate will be reduced. This obstructs the provision of a small-sized and light-weight image pick-up apparatus using such a circuit substrate.

3

In addition, it has been proposed that the multiplex sampling circuit 3 is integrated into the chip of the solid-state image pick-up device 1. However, this raises another problem in that the circuit scale of the solid-state image pick-up device 1 increases with increase of the number of input/output terminals in the solid-state image pick-up device 1. Thus, various other problems will easily be created during production of the solid-state image pick-up device 1, resulting in increase of the manufacturing cost.

SUMMARY OF THE INVENTION

It is therefore an object of the present invention to provide a solid-state image pick-up device which can stabilize the operation of the sampling circuits while minimizing the circuit scale of the solid-state image pick-up device and also to provide an image pick-up apparatus using such a solid-state image pick-up device.

To this end, the present invention provides a solid-state image pick-up device comprising a plurality of light-receiving pixels for generating and accumulating information charges in proportion to the amount of incident light; a charge transfer section for reading out packets of information charges respectively from said plurality of light-receiving pixels and sequentially transferring them in a given transfer cycle; an output section for converting the packets of information charges outputted from said charge transfer section into voltage signals in said transfer cycle; an impedance conversion circuit for outputting picture signals depending on the output of said output section, said impedance conversion circuit having an output impedance lower than an input impedance; and a clamp circuit for fixing said picture signals at a predetermined voltage in said transfer cycle; said solid-state image pick-up device being integrated on a single semiconductor substrate.

In the solid-state image pick-up device of the present invention, the clamp circuit fixes the picture signals at a predetermined voltage at a particular timing after the capacitor of the output section has been charged to a given voltage. The clamp circuit, output section and impedance conversion circuit are integrated on the same substrate. Thus, the reference level in the picture signals can be prevented from being influenced by noise and maintained constant. When the picture signals outputted from the solid-state image pick-up device are sampled during a time period in which the picture signals are indicating the signal level, the picture signals can be provided without being influenced by noise.

The present invention also provides an image pick-up apparatus comprising a solid-state image pick-up device for charging a floating capacitor to a predetermined potential during a first time period of an information charge transfer cycle prior to a second time period thereof, including a time period in which a packet of information charges are being outputted from a charge transfer section, thereafter accumulating the information charges in the floating capacitor during the second time period and fixing a signal corresponding to a change of potential in the floating capacitor at a predetermined voltage during a third time period between the first and second time periods, this signal being outputted from the solid-state image pick-up device as a first picture signal; and a picture signal processing device for outputting a second picture signal, the picture signal processing device including a sampling circuit for receiving the first picture signal from the solid-state image pick-up device, holding the voltage of the first picture signal in the second time period, and outputting the held voltage as the second picture signal.

In the image pick-up apparatus of the present invention, the clamp circuit for fixing the reference level of an output appearing for a short time is provided within the solid-state image pick-up device, while the sampling circuit for sampling the signal level of an output appearing for a long time is formed by the signal processing device. Therefore, the signal processing device can easily be phased. As a result, the restriction relating to the frequency characteristics can be relieved in the signal processing device.

DETAILED DESCRIPTION OF THE PREFERRED EMBODIMENTS

Figure 1:
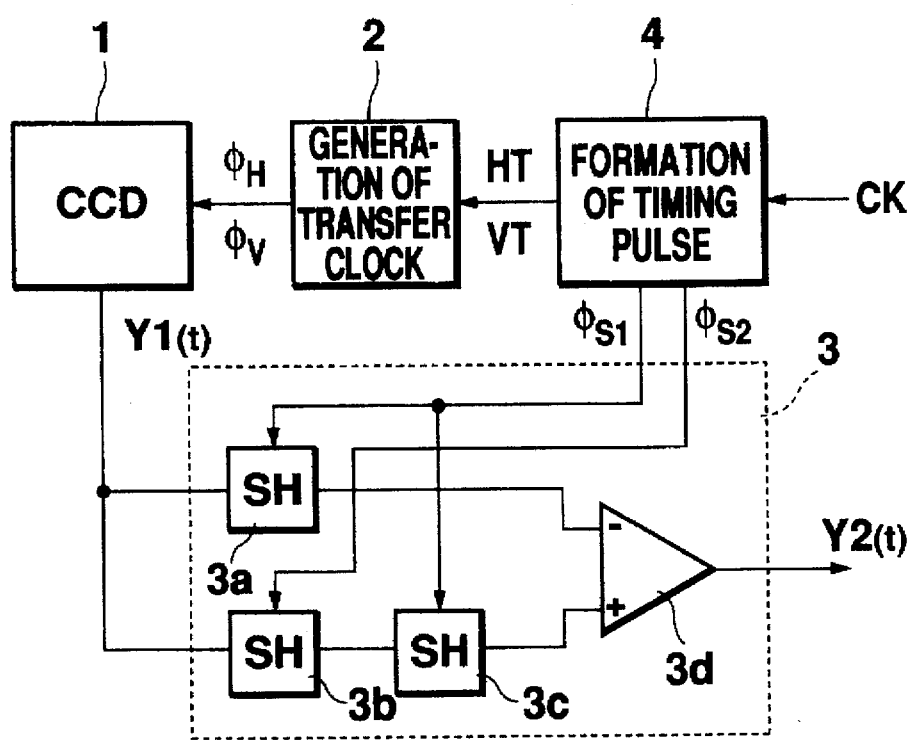
FIG. 1 is a block diagram of a solid-state image pick-up device constructed in accordance with the prior art.
Figure 2:
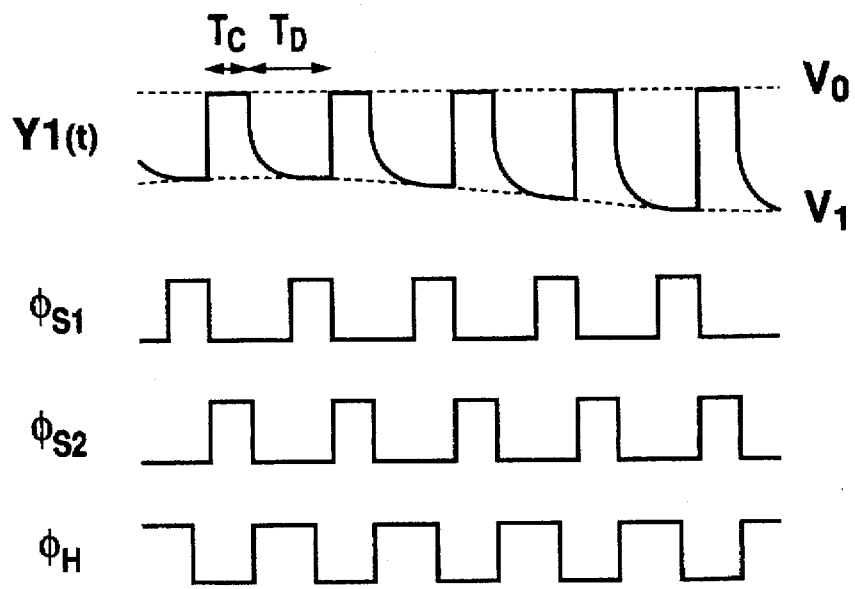
FIG. 2 are waveforms of clock pulses and outputs that illustrate the operation of the solid-state image pick-up device of the prior art.
Figure 3:
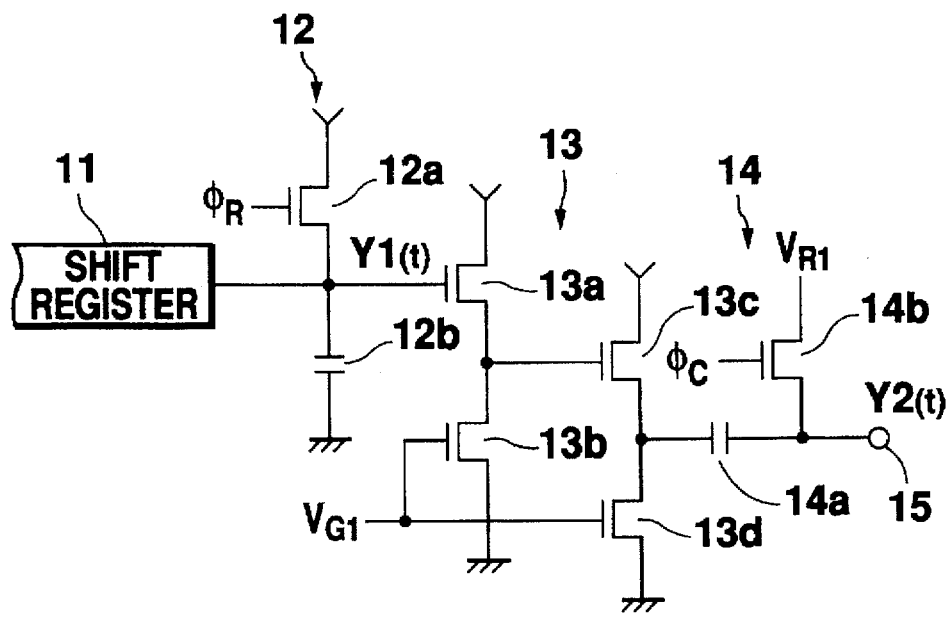
FIG. 3 is a circuit diagram showing the output section of a solid-state image pick-up device constructed in accordance with the present invention.
Figure 4:
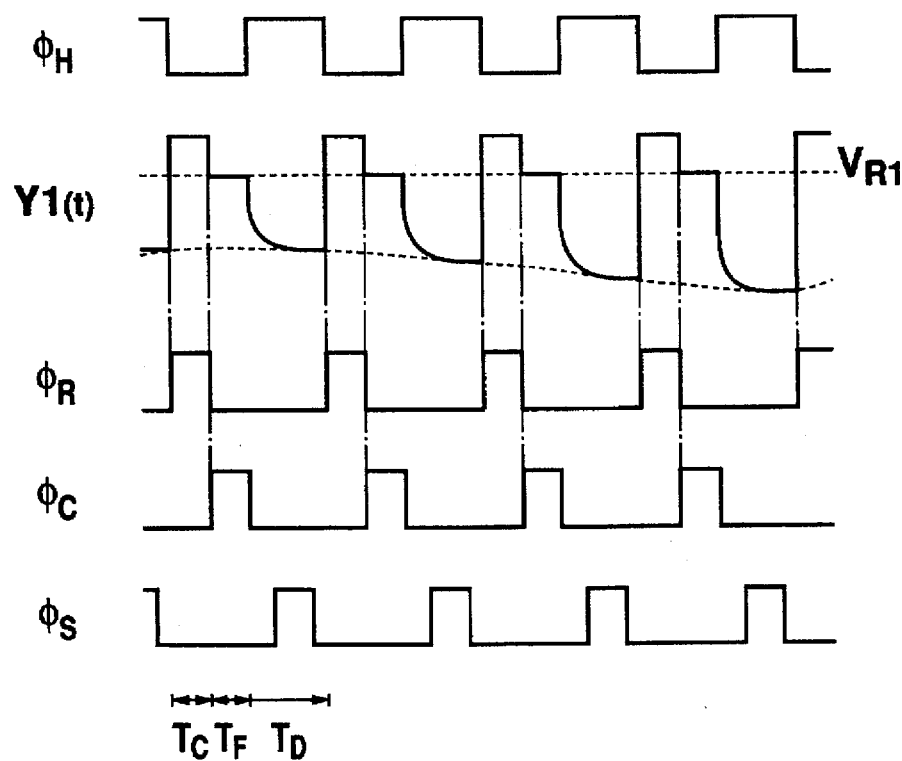
FIG. 4 are waveforms of clock pulses and intermediate outputs that illustrate the operation of the solid-state image pick-up device shown in FIG. 3.

FIG. 3 is a circuit diagram showing the output section of a solid-state image pick-up device constructed in accordance with the present invention while FIG. 4 are waveforms illustrating the operation thereof.

A horizontal shift register 11 includes a number of bits, each of which accumulates signal charges outputted from a vertical shift register (not shown), the vertical shift register being provided corresponding to the respective array of a plurality of light-receiving pixels which are arranged in a matrix. The horizontal shift register is responsive to a horizontal transfer clock $\phi H$ for sequentially transferring a packet of information charges accumulated in each bit toward an output circuit 12 on the output side of the horizontal shift register. The output circuit 12 comprises a transistor 12a and a capacitor 12b. The gate of the transistor 12a is adapted to receive a reset clock $\phi R$. The transistor 12a is connected between the output of the horizontal shift register 11 and a power source while the capacitor 12b is connected between the output of the horizontal shift register 11 and ground. The capacitor 12b is charged through the transistor 12a when the latter is turned on by the reset clock $\phi R$ in synchronism with the horizontal transfer clock $\phi H$. The capacitor 12b is discharged when it receives information charges outputted from the horizontal shift register 11. Such a fluctuation in the potential of the capacitor 12b will be outputted as a picture signal Y1(t). The source area of the transistor 12a in the output circuit 12 is normally provided to connect with the end of the channel output side of the horizontal shift register 11. Thus, the junction capacitance in the source of the transistor 12a can be utilized as the capacitor 12b.

The transistor 12a is turned on during a time period between the leading and trailing edges of the reset clock $\phi R$. As the transistor 12a is turned on, the capacitor 12b is charged to a predetermined voltage. The period during which the reset clock $\phi R$ is at a high level will be called a charge period TC. When the transistor 12a is turned off at the trailing edge of the reset clock $\phi R$, the voltage outputted from the capacitor 12b is reduced by a level corresponding to the gate capacitance of the transistor 12a, but will be maintained at a constant level until the horizontal transfer clock φH is inverted. During a period TF in which the transistor 12 is turned off and the horizontal transfer clock φH is then inverted, the capacitor 12b becomes a floating state. During this period TF, the voltage created across the capacitor 12b becomes the reference level in the picture signal Y1(t). After the horizontal transfer clock φH has been inverted and when a packet of information charges are transferred from the horizontal shift register 11 toward the source area of the transistor 12a, the capacitor 12b is discharged depending on the amount of the transferred information charges. Thus, the voltage across the capacitor 12b is lowered by a level corresponding to the packet of information charges. A time period from a time when the horizontal transfer clock φH is inverted and the information charges are transferred and outputted from the horizontal shift register 11 toward the source area of the transistor 12a, to a time when the transistor 12a is turned on at the leading edge of the reset clock φR, will be called a discharge period TD. The charge, floating and discharge periods TC, TF, and TD define one operational cycle.

An impedance conversion circuit 13 comprises four transistors 13a, 13b, 13c and 13d all of which form a two-stage source follower circuit. The gate of the transistor 13a receives the picture signal Y1(t) while the gate of the transistor 13b receives a control voltage G1. These transistors 13a and 13b are connected in series between the power source and ground. Similarly, the transistors 13c and 13d are connected in series between the power source and ground. The gate of the transistor 13c is connected to the source of the transistor 13a while the gate of the transistor 13d receives the same control voltage G1 as in the transistor 13b. Thus, the output impedance at the source side of the transistor 13c becomes lower than the input impedance at the picture signal Y1(t) provided to the gate of the transistor 13a. This improves the drive power into the output load of the impedance conversion circuit 13.

A clamp circuit 14 comprises a capacitor 14a and a transistor 14b. The transistor 14b includes a gate receiving a clamp clock φC, a drain receiving a reference voltage VR1 and a source connected to the output of the impedance conversion circuit 13 through the capacitor 14a. The clamp clock φC rises immediately after the reset clock φR has fallen and holds the transistor 14a at its ON state during the period TF until the horizontal transfer clock φH is inverted. Thus, the voltage corresponding the picture signal Y1(t) during the period TF is clamped at the reference voltage VR1. The potential of the capacitor 14a is then outputted through an output terminal 15 as a second picture signal Y2(t).

The output circuit 12, impedance conversion circuit and clamp circuit 14 are integrated onto the same semiconductor substrate with the horizontal shift register 11.

In such a manner, the reference level of the picture signal Y2(t) outputted from the solid-state image pick-up device including the clamp circuit 14 will be maintained at the reference voltage VR1. When a sampling clock φS is generated during the discharge period TD and if the voltage of the picture signal Y2(t) during the discharge period TD is taken in by the sampling circuit, a fluctuation in the signal level due to the influence of noise can be removed.

Figure 5:
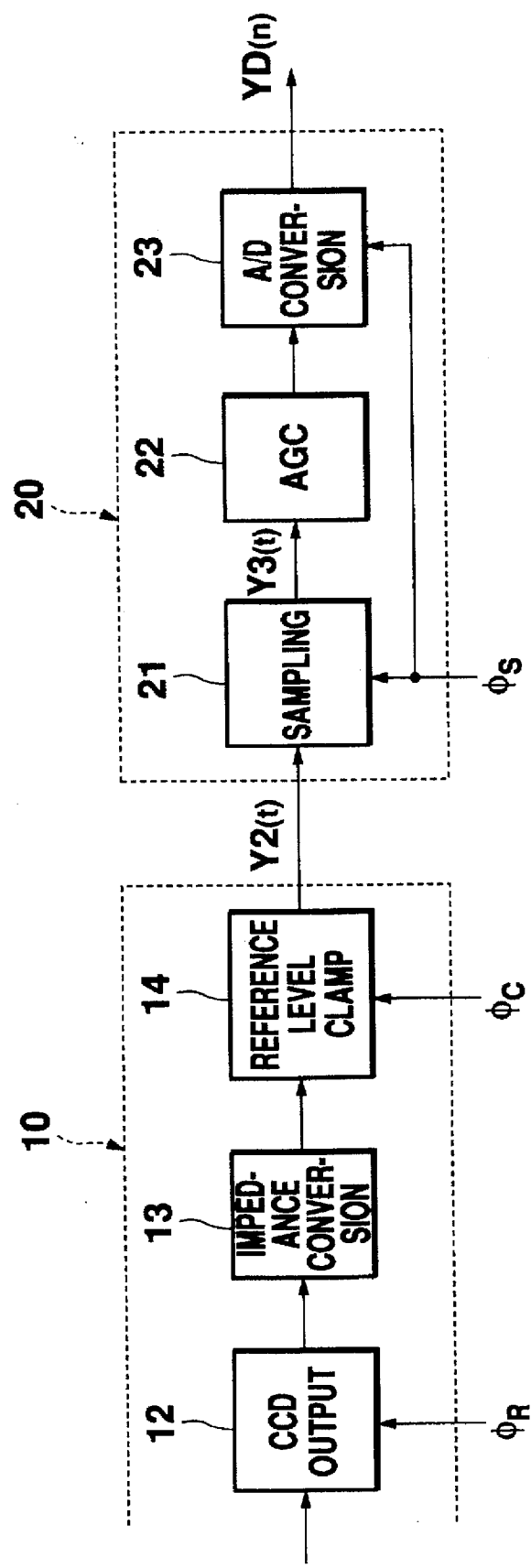
FIG. 5 is a block diagram of a solid-state image pick-up device constructed in accordance with the present invention.

FIG. 5 is a block diagram of a solid-state image pick-up apparatus constructed in accordance with the present invention.

As in the previous embodiment of FIG. 3, a solid-state image pick-up device 10 comprises an output circuit 12, impedance conversion circuit 13 and clamp circuit 14 which are integrated onto the same semiconductor substrate, together with light-receiving pixels and vertical and horizontal shift registers. The output circuit 12, impedance conversion circuit 13 and clamp circuit 14 are similar to those of FIG. 3. The picture signal Y1(t) is outputted from the output circuit 12 toward the clamp circuit 14 through the impedance conversion circuit 13. The clamp circuit 14 fixes the reference level in the picture signal Y1(t) and then outputs the picture signal Y2(t).

The circuits 12, 13 and 14 of the solid-state image pick-up device 10 subsequent to the horizontal shift register 11 are formed of an N-channel MOS transistor, as shown in FIG. 3. Thus, these circuits are suitable for use in a high-speed mode. Even if the frequencies of the reset clock φR and clamp clock φC are relatively high, the solid-state image pick-up device 10 can operate in a stable manner.

A picture signal processing device 20 comprises a sampling circuit 21, an auto gain control circuit (AGC) 22 and an analog-to-digital (A/D) conversion circuit 23 all of which are integrated onto the same semiconductor substrate. The sampling circuit 21 is responsive to the sampling clock φS for sampling the picture signal Y2(t) to output a picture signal Y3(t) which only contains continuous signal levels depending on the information charges. The frequency of the sampling clock φS is the same as those of the reset clock φR and clamp clock φC. Since the discharge period TD through which the signal level is outputted is longer than the period TF during which the reference level is clamped, however, the phase of the sampling clock φS can easily be set. The auto gain control circuit 22 provides a gain corresponding to the average level of the picture signal Y3(t) during one vertical scan period to the picture signal Y3(t) so that the average level during each vertical scan period will be limited within a given range. The A/D conversion circuit 23 converts the picture signal Y3(t) into digital data in synchronism with the sampling clock φS to form an output picture data YD(n). The picture data YD(n) is inputted into a digital signal processor wherein the picture data YD(n) is subjected to various treatments, level correction and line interpolation and also to color balance adjustment when the image to be treated is a color image. Thereafter, the data will be recorded onto a given recording medium.

When the clamp circuit 14 for clamping the picture signal at the reference level is provided in the solid-state image pick-up device and the sampling circuit 21 for sampling the signal level of the picture signal is disposed in the picture signal processing device 20, the restriction for the frequency characteristics in the signal processing device 20 can greatly be relieved. Thus, the degree of freedom in the circuit design can be enlarged. This is advantageous for multi-functioning.

According to the present invention, the reference level of the picture signal provided by the solid-state image pick-up device will not be influenced and caused to influctuate by noise. Therefore, the present invention does not require a multiplex sampling circuit for extracting a difference between the reference level and the signal level from the output of the solid-state image pick-up device. This can simplify the structure of the signal processing circuit for taking in the output of the solid-state image pick-up device.

In the aforementioned arrangement, furthermore, the signal processing device tends to be subjected to less restriction relating to the frequency characteristics. Therefore, the clocks can easily be phased to one another. As a result, the degree of freedom in the design of circuit elements can be enlarged. This enables the circuit scale to be reduced and the system to be made multifunctional, with a reduction of the manufacturing cost.

I claim:

1. A solid-state image pick-up device for converting an optical image into picture signals which are electrical signals in time series, the solid-state image pick-up device comprising:

a first semiconductor substrate having the following formed thereon:
 a plurality of light-receiving pixels for generating and accumulating a quantity of information charges based upon an amount of incident light;
 a charge transfer section for reading out packets of information charges respectively from said plurality of light-receiving pixels and transferring the charges in a given transfer cycle;
 an output section for converting each packet of information charges transferred from said charge transfer section into voltage signals in said transfer cycle;
 an impedance conversion circuit for outputting a picture signal depending on the voltage signals from said output section, said impedance conversion circuit having an output impedance lower than an input impedance; and
 a clamp circuit for fixing said picture signal at a predetermined voltage during a portion of said transfer cycle to produce a fixed picture signal; and a second semiconductor substrate having formed thereon a plurality of sample and hold circuits for providing a sampled picture signal based upon the fixed picture signal.

2. A solid-state image pick-up device as defined in claim 1 wherein said output section comprises a floating capacitor for accumulating the packet of information charges, a reset power source for charging said floating capacitor to a first predetermined potential and a reset switch connecting said floating capacitor with said reset power source, said output section being operative to activate said reset switch for charging said floating capacitor through said power source during a first time period prior to a second time period including a time period during which the packet of information charges is being outputted from said charge transfer portion and being also operative to accumulate the packet of information charges in said floating capacitor during said second time period, said clamp circuit being operative to fix said picture signal during a third time period between said first and second time periods.

3. A solid-state image pick-up device as defined in claim wherein said clamp circuit comprises a clamp capacitor coupled in series to the output of said impedance conversion circuit, a clamp power source for charging the output side of said clamp capacitor to a second predetermined potential, and a clamp switch connecting between said clamp capacitor and said clamp power source.

4. An image pick-up apparatus for converting an optical image into picture signals which are electrical signals in time series, the image pick-up apparatus comprising:

a solid-state image pick-up device formed on a first substrate for charging a floating capacitor to a predetermined potential during a first time period of an information charge transfer cycle prior to a second time period thereof including a time period during which a packet of information charges are being outputted from a charge transfer section, the information charges thereafter accumulating in the floating capacitor during the second time period, and the solid state image pick-up device fixing a signal corresponding to a change of potential in the floating capacitor at a predetermined voltage during a third time period between the first and second time periods, said signal being outputted from said solid-state image pick-up device as a first picture signal; and a picture signal processing device formed on a second substrate for outputting a second picture signal, said picture signal processing device including a sampling circuit for receiving the first picture signal from said solid-state image pick-up device, holding the voltage of the first picture signal in the second time period, and outputting the held voltage as the second picture signal.

5. An image pick-up apparatus as defined in claim 4, wherein said picture signal processing device includes a gain control circuit for providing a given gain to the held voltage being the output of said sampling circuit, the held voltage being outputted therefrom.

6. An image pick-up apparatus as defined in claim 4, wherein said picture signal processing device includes an analog-to-digital conversion circuit for providing digital data based upon said second picture signal.

7. An image pick-up apparatus for converting an optical image into sampled picture signals which are electrical signals in time series, the image pick-up apparatus comprising:

a first substrate including:
 a plurality of light-receiving pixels for generating and accumulating a quantity of information charges based upon an amount of incident light;
 a charge transfer section for reading oat packets of information charges respectively from said plurality of light-receiving pixels and transferring the charges in a given transfer cycle;
 an output section for converting each packet of information charges transferred from said charge transfer section into voltage signals in said transfer cycle;
 an impedance conversion circuit for outputting a picture signal depending on the voltage signals from said output section, said impedance conversion circuit having an output impedance lower than an input impedance; and
 a clamp circuit for fixing said picture signal at a predetermined voltage during a portion of said transfer cycle to provide a fixed picture signal; and a second substrate including a plurality of sample and hold circuits for providing a sampled picture signal based upon the fixed picture signal.

* * * * *